(12) United States Patent
Huang et al.

(10) Patent No.: US 8,781,232 B2
(45) Date of Patent: Jul. 15, 2014

(54) IMAGE PROCESSING APPARATUS AND METHOD

(71) Applicant: Sony Corporation, Tokyo (JP)

(72) Inventors: Huakun Huang, Beijing (CN); Kaname Ogawa, Beijing (CN)

(73) Assignee: Sony Corporation, Tokyo (JP)

( * ) Notice: Subject to any disclaimer, the term of this patent is extended or adjusted under 35 U.S.C. 154(b) by 27 days.

(21) Appl. No.: 13/719,971

(22) Filed: Dec. 19, 2012

(65) Prior Publication Data

US 2013/0188871 A1    Jul. 25, 2013

(30) Foreign Application Priority Data

Jan. 19, 2012   (CN) .......................... 2012 1 0018287

(51) Int. Cl.
*G06K 9/46*   (2006.01)
*G06K 9/00*   (2006.01)

(52) U.S. Cl.
USPC ....................................................... 382/190

(58) Field of Classification Search
USPC ......... 382/157, 164, 173, 190, 224, 225, 270; 348/224.1, 370, 371
See application file for complete search history.

(56) References Cited

U.S. PATENT DOCUMENTS

| | | | | |
|---|---|---|---|---|
| 4,809,349 A * | 2/1989 | Herby et al. | .................. | 382/270 |
| 5,838,816 A * | 11/1998 | Holmberg | ..................... | 382/157 |
| 7,808,532 B2 * | 10/2010 | Sun et al. | ................... | 348/224.1 |
| 8,014,596 B2 * | 9/2011 | Campbell et al. | ............. | 382/164 |
| 2013/0188871 A1 * | 7/2013 | Huang et al. | .................. | 382/173 |

* cited by examiner

*Primary Examiner* — Amir Alavi
(74) *Attorney, Agent, or Firm* — Oblon, Spivak, McClelland, Maier & Neustadt, L.L.P.

(57) ABSTRACT

An image processing apparatus and method are disclosed. The image processing apparatus may include: a feature acquiring device configured to acquire values of a plurality of features of each pixel block in an object region of an image frame, each pixel block containing N×M pixels, N≥1, M≥1; an estimating device configured to estimate capability, of each of the plurality of features of each pixel block, of reflecting difference between background and an object in the image frame according to the object region and the background in the image frame; and a feature weighting device configured to assign a weight to each of the plurality of features according to the capability of each feature reflecting difference between background and the object, to emphasize a feature corresponding to a stronger capability.

20 Claims, 6 Drawing Sheets

IMAGE PROCESSING APPARATUS AND METHOD

CROSS-REFERENCE TO RELATED APPLICATION

The application claims priority to Chinese patent application No. 201210018287.1 filed on Jan. 19, 2012 and entitled "Image Processing Apparatus and Method", the contents of which are incorporated herein in its entirety.

FIELD

The disclosure relates to image processing field, and particularly, to an image to processing apparatus and method.

BACKGROUND

Object tracking or matching is an important branch of the image processing field. During object tracking, the features of an object may be unstable. For example, the gray level and color features in a captured image may change due to the change of sun light radiation, and the texture feature of the image may be affected by the deformation of the object. A solution is to combine multiple of features. However, such a solution may incur a heavy computing load and may be hard to be implemented by hardware, and the like.

On the other hand, during object tracking, when initializing an object block, it may be unavoidable to include a part of background into the object block. Thus, interference may be introduced into features extracted from the object block. The larger the interference due to the background is, the lower the preciseness of subsequent object matching would be. Thus how to cancel the interference of the background is a hot point in object tracking technology. A solution is to use kernel function to decrease the interference from the background. The relevant documents include: Dorin Comaniciu, et al., "*Kernel-based object tracking*" (*Pattern Analysis and Machine Intelligence*, May, 2003) (referred to as Relevant Document 1). However, such a method cannot precisely cancel the interference of the background.

SUMMARY

The following presents a simplified summary of the disclosure in order to provide a basic understanding of some aspects of the disclosure. This summary is not an exhaustive overview of the disclosure. It is not intended to identify key or critical elements of the disclosure or to delineate the scope of the disclosure. Its sole purpose is to present some concepts in a simplified form as a prelude to the more detailed description that is discussed later.

According to one aspect of the disclosure, there is provided an image processing apparatus which may include: a feature acquiring device configured to acquire values of a plurality of features of each pixel block in an object region of an image frame, each pixel block containing N×M pixels, $N \geq 1$, $M \geq 1$; an estimating device configured to estimate capability, of each of the plurality of features of each pixel block, of reflecting difference between background and object in the image frame according to the object region and the background in the image frame; and a feature weighting device configured to assign a weight to each of the plurality of features according to the capability of each feature reflecting difference between background and object, to emphasize a feature corresponding to a stronger capability, wherein the image processing apparatus performs an image matching to the object based on the features weighted by the feature weighting device.

According to another aspect of the disclosure, there is provided a camera apparatus which may include: an image capturing element, an optical system configured to form an image of an object on the image capturing element; and an image processing apparatus configured to track the object in an image frame captured by the image capturing element. The image processing apparatus may include: a feature acquiring device, configured to acquire values of a plurality of features of each pixel block in an object region of an image frame, each pixel block containing N×M pixels, $N \geq 1$, $M \geq 1$; an estimating device, configured to estimate capability, of each of the plurality of features of each pixel block, of reflecting difference between background and object in the image frame according to the object region and the background in the image frame; and a feature weighting device, configured to assign a weight to each of the plurality of features of each pixel block according to the capability of each feature reflecting difference between background and object, to emphasize a feature corresponding to a stronger capability reflecting difference between background and object, wherein the image processing apparatus tracks the object based on the features weighted by the feature weighting device.

According to another aspect of the disclosure, there is provided an image processing method which may include: acquiring values of a plurality of features of each pixel block in an object region of an image frame, each pixel block containing N×M pixels, $N \geq 1$, $M \geq 1$; estimating capability, of each of the plurality of features of each pixel block, of reflecting difference between background and object in the image frame according to the object region and the background in the image frame; and assigning a weight to each of the plurality of features according to the capability of each feature reflecting difference between background and object, to emphasize a feature corresponding to a stronger capability, wherein an image matching is performed to the object based on the features weighted as described above.

The above image processing apparatus and method enable the pixel-based feature selection. Different features can be selected for different pixels in the object region. In the case that a plurality of the same features is used for a plurality of pixels in the object region, the weights for the features may be different from pixel to pixel. In addition, each feature of a pixel is weighted according to its capability of differentiating the object from the background, that is, the feature which has a strong capability of differentiating the object from the background is emphasized, while the feature which has a weak capability of differentiating the object from the background is weakened, such that the weight of a feature reflects the feature's capability of describing the object (its capability of differentiating the object from the background). Accordingly, the interference of the background to the object may be canceled effectively.

In addition, some embodiments of the disclosure further provide computer program for realizing the above method.

Further, some embodiments of the disclosure further provide computer program products in at least the form of computer-readable medium, upon which computer program codes for realizing the above image processing method are recorded.

BRIEF DESCRIPTION OF DRAWINGS

The above and other objects, features and advantages of the embodiments of the disclosure can be better understood with reference to the description given below in conjunction with the accompanying drawings, throughout which identical or like components are denoted by identical or like reference signs. In addition the components shown in the drawings are merely to illustrate the principle of the disclosure. In the drawings.

DETAILED DESCRIPTION

Some embodiments of the present disclosure will be described in conjunction with the accompanying drawings hereinafter. It should be noted that the elements and/or features shown in a drawing or disclosed in an embodiments may be combined with the elements and/or features shown in one or more other drawing or embodiments. It should be further noted that some details regarding some components and/or processes irrelevant to the disclosure or well known in the art are omitted for the sake of clarity and conciseness.

The inventors of the disclosure found that, in conventional method of combining multiple of features, the object region is generally treated as a whole such that the same features are selected for all the pixels in the object region. However, for example, for a part of an object the color feature may be a feature that can distinguish this part of the object from the background, while for another part of the same object the contour feature may be a feature that can distinguish the another part of the object from the background.

In addition, in the conventional methods of using kernel function to cancel the background, since it is assumed that the area near the center of an object region is more likely to contain the object while the area distant from the center is more likely to be background, the object region is generally multiplied by a Gauss distributed weight mask (i.e. the kernel function). In this way, a pixel near the center may be assigned with a larger weight, and a pixel at the edge of the region may be assigned with a smaller weight. Accordingly, the interference due to the background at the edge may be suppressed. However, the weights used in the method are distributed in an ellipse shape, which cannot precisely cancel the interference of the background based on the shape of the object. Part of pixels of the object may be assigned with adequately lower weights.

Figure 1:
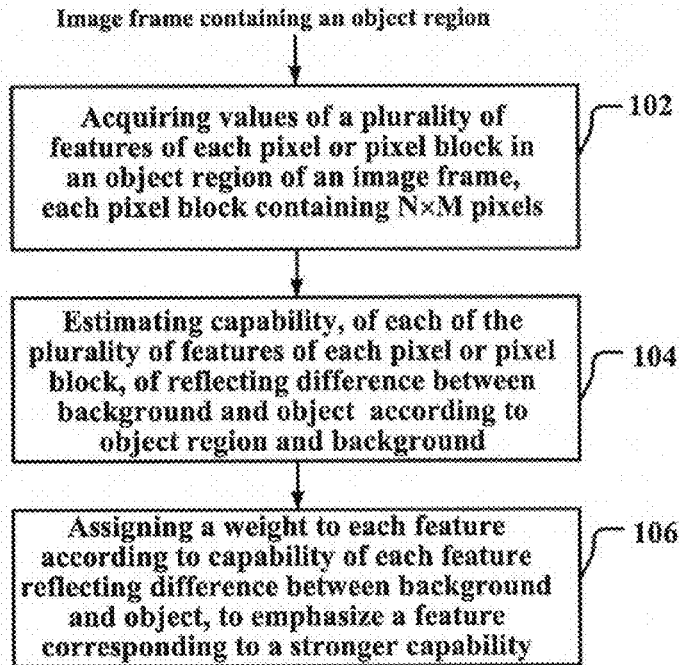
FIG. 1 is a schematic flow chart illustrating an image processing method according to an embodiment of the disclosure.

Some embodiments of the disclosure provide image processing methods and apparatuses which may be enable pixel-based feature selection and effectively cancel the interference of background on object tracking. FIG. 1 is a schematic flow chart showing an image processing method according to an embodiment of the disclosure.

As shown in FIG. 1, the image processing method may include steps 102, 104 and 106.

In step 102, for each pixel or pixel block containing multiple of pixels in an object region of an image frame (e.g. an initial image frame in a video sequence or other image sequence), values of a plurality of features of the pixel is acquired.

The object region refers to a region containing an object in the image frame. The object region may be obtained by manual labeling of a user, or may be automatically recognized by using any appropriate object identifying method (any appropriated object identifying method in the art may be used here based on practical scenarios and is not numerated herein), the description of which is not detailed herein. In addition, the object region may be of a rectangular shape, or may be of any other shapes, such as circular shape, ellipse shape, trapezoid shape, or triangle shape, or the like. The disclosure is not limited to any particular example herein.

The plurality of features of a pixel may include any features related to the pixel. For example, the gray level and/or color (such as blue and/or red component, etc.) of the pixel may be used. Or any other appropriate feature, such as contour feature, color or gray-level Histogram feature and/or texture feature, may be used. The disclosure is not limited to any particular example herein.

After obtaining the values of the plurality of features of the pixel, the capability, of each of the plurality of features of each pixel or each pixel block containing multiple of pixels, of reflecting the difference between background and object in the image frame according to the object region and the background in the image frame is estimated in step 104. In other words, the capability of each feature of each pixel or pixel block distinguishing the object region from the background is estimated. The capability may be estimated by using the method to be described below with reference to FIG. 2 or FIG. 4, or using any other appropriate estimating method.

In step 106, a weight is assigned to each of the plurality of features of each pixel or pixel block according to the capability of the feature reflecting difference between background and object, to emphasize the feature corresponding to a stronger capability reflecting difference between background and object. As an embodiment of the disclosure, the larger the capability of a feature is, the larger the weight assigned to the feature is. That is, the weaker the capability of a feature is, the smaller the weight assigned to the feature is. As another embodiment of the disclosure, the feature(s) which has a strong capability of reflecting the difference between background and object is assigned with the weight of "1", and the feature(s) which has a weak capability of reflecting the difference between background and object is assigned with the weight of "0".

In the method, the weights for a plurality of features of each pixel in the object region may be obtained. Thus, in the subsequent object matching or tracking, the weighted sum of these features may be calculated as the confidence level of each pixel representing the object. The above processes may be performed to each pixel in the object region, and thus different features may be selected for different pixels in the object region. In the case that the same features are used for some pixels, the weights for the features are different for the different pixels. In other words, the pixel-based feature selection is implemented by using the method. In addition, each feature of a pixel is weighted according to its capability of differentiating the object from the background, that is, the feature which has a strong capability of differentiating the object from the background is emphasized, while the feature which has a weak capability of differentiating the object from the background is weakened, such that the weight of a feature reflects the feature's capability of describing the object (its capability of differentiating the object from the background). Accordingly, the interference of the background to the object may be canceled effectively.

The above processes may be performed with respect to each pixel block containing N×M pixels (N≥1, M≥1). For conciseness, the following description is given in the unit of a pixel. But it shall be appreciated that the processes in the disclosure are adaptable to be performed in the unit of a pixel block. And in the case of using a pixel block, the plurality of features of a pixel block may be any feature related to the pixel block. For example, the mean values, the medium value or the sum value of the gray levels and/or colors (such as blue and/or red components, etc.) of pixels in the pixel block may be used as the features of the pixel block. Or any other appropriate feature, such as contour feature, color or gray-level Histogram feature and/or texture feature, may be used according to the practical requirements of the image to be detected. The disclosure is not limited to any particular example herein.

Figure 2:
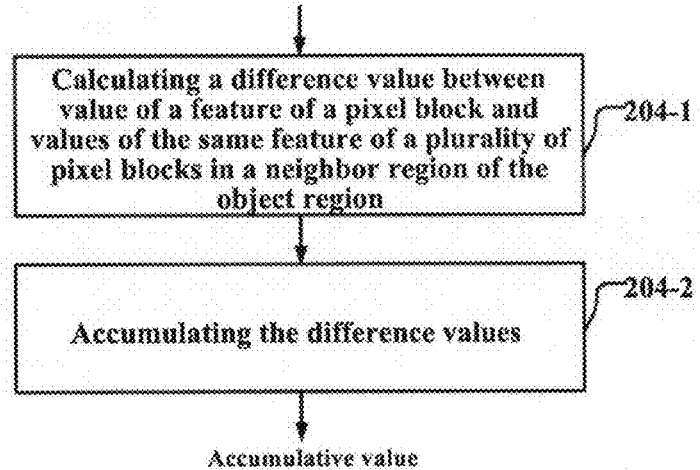
FIG. 2 is a schematic flow chart illustrating an example of estimating the capability of a feature of a pixel to differentiate the object from the background as shown in FIG. 1.

FIG. 2 shows an example of estimating the capability of a feature of a pixel or a pixel block to differentiate the object from the background. The larger the difference between the value of a feature of an object pixel and the value of the same feature of a background pixel is, the stronger the capability of the feature distinguishing the object from the background is, and vise versa. The method shown in FIG. 2 is based on this principle.

As shown in FIG. 2, the estimating method may include steps 204-1, and 204-2. In step 204-1, the difference value between the value of a feature (i.e. one of the plurality of features, for conciseness, also referred to as the first feature) of a pixel or pixel block in the object region and the value of the same feature of each of a plurality of pixels or pixel blocks in the neighbor region of the object region is calculated, thus obtaining a plurality of difference values. The plurality of pixels in the neighbor region may include part of background pixels selected from the neighbor region, or may include all the pixels in the neighbor region. Then in step 204-2, the plurality of difference values is accumulated. The larger the accumulative value is, the larger the difference values between the value of the first feature of the pixel or pixel block and the values of the first feature of the pixels or pixel blocks in the neighbor region are, and vise versa. Thus the accumulative value is an important index representing the capability of the first feature of the pixel or pixel block of reflecting the difference between background and object.

In the disclosure, the difference value between the values of a feature of two pixels or pixel blocks may be the difference between the values of a feature of two pixels or pixel blocks or the absolute value of the difference. For example, in the image shown in FIG. 3, it is supposed that the person indicated by the reference number 310 is the object to be detected, the circular part 311 represents its head, the triangle part 312 represents its upper body and the two rectangular parts 313 represents its two legs. The region within the block 320 represents an object region containing the object and the region within the block 330 (referred to as neighbor region 330) represents the neighbor region of the object region 320. It is supposed that 3 features including the gray level component, the blue component and the red component are selected for the pixel located at (x,y) in the object region 320, as the plurality of features for this pixel. The accumulative values, each of which reflects the capability of the corresponding feature for distinguishing the object from the background, obtained by using the method as shown in FIG. 2 may be represented as follows:

$$Y_{(x,y)D} = \sum_{(i,j) \in NeighborRegion} |Y_{(x,y)F} - Y_{(i,j)B}| \quad (1)$$

$$Cb_{(x,y)D} = \sum_{(i,j) \in NeighborReigon} |Cb_{(x,y)F} - Cb_{(i,j)B}| \quad (2)$$

$$Cr_{(x,y)D} = \sum_{(i,j) \in NeighborRegion} |Cr_{(x,y)F} - Cr_{(i,j)B}| \quad (3)$$

In the above equations, $Y_{(x,y)F}$ denotes the gray level component value of the pixel located at (x,y) in the object region, $Cb_{(x,y)F}$ denotes the blue component value of the pixel located at (x,y) in the object region, $Cr_{(x,y)F}$ denotes the red component value of the pixel located at (x,y) in the object region; $Y_{(i,j)B}$ denotes the gray level component value of the pixel located at (i,j) in the neighbor region of the object region, $Cb_{(i,j)B}$ denotes the blue component value of the pixel located at (i,j) in the neighbor region of the object region, $Cr_{(i,j)B}$ denotes the red component value of the pixel located at (i,j) in the neighbor region of the object region; $Y_{(x,y)D}$ denotes the accumulative value of differences between the gray level component value of the pixel (x,y) and the gray level component values of a plurality of pixels in the neighbor region, and reflects the capability of the gray level component of distinguishing the object from the background; $Cb_{(x,y)D}$ denotes the accumulative value of differences between the blue component value of the pixel (x,y) and the blue component values of a plurality of pixels in the neighbor region, and reflects the capability of the blue component feature of distinguishing the object from the background; and $Cr_{(x,y)D}$ denotes the accumulative value of differences between the red component value of the pixel (x,y) and the red component values of a plurality of pixels in the neighbor region, and reflects the capability of the red component feature of distinguishing the object from the background. In the equations (1)-(3), the pixel (i,j) in the neighbor region may refer to part of background pixels in the neighbor region 330, or may refer to all the pixels in the neighbor region 330.

The accumulative value of differences obtained by using the method shown in FIG. 2 can effectively characterize the capability of a feature of a pixel reflecting the differences between the background and the object, each feature of the pixel may be weighted by using the corresponding accumulative value, thereby effectively canceling the interference of the background to the object. In addition, the method shown in FIG. 2 involves only the addition and multiplying operations of values which incur only a relatively low computing amount. Thus, the operation efficiency can be improved effectively. In addition, the method can be readily realized by hardware.

Figure 4:
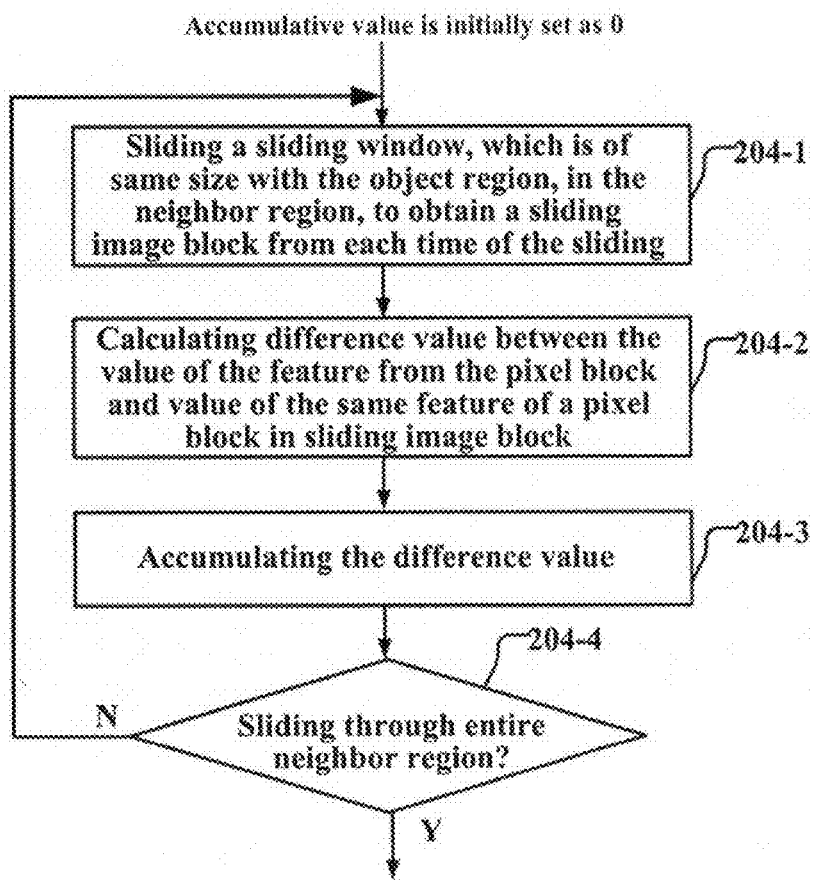
FIG. 4 is a schematic flow chart illustrating another example of estimating the capability of a feature of a pixel to differentiate the object from the background as shown in FIG. 1.

FIG. 4 shows another example of estimating the capability of a feature of a pixel or a pixel block to differentiate the object from the background. Similar to the method shown in FIG. 2, in the method shown in FIG. 4, the accumulative value of differences between the value of a feature of a pixel in the object region and the values of the same feature of pixels in the neighbor region is also used to represent the capability of the feature of the pixel in the object region to distinguish the object from the background. The difference lies in that, in the method shown in FIG. 4 a sliding window is employed to calculate the accumulative value of differences. At the beginning of the process, the initial accumulative value of differences may be set as 0.

As shown in FIG. 4, the method may include steps 404-1, 404-2, 404-3 and 404-4.

Figure 5:
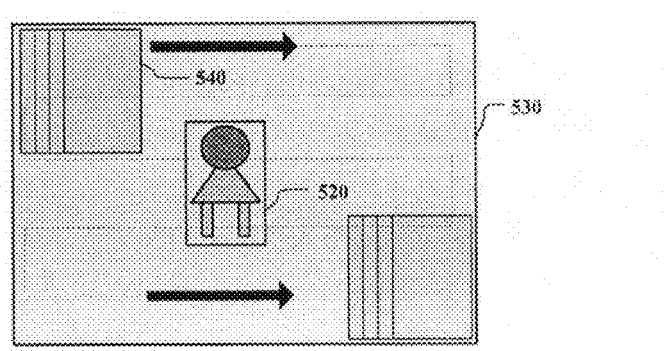
FIG. 5 is a schematic diagram illustrating the path of sliding a sliding window over the neighbor region of an object region.

In step 404-1, a sliding window which is of the same size with the object region is used to slide in the neighbor region of the object region. By sliding the window each time, an image block corresponding to the sliding window may be obtained. For example, in the image shown in FIG. 5, the reference number 520 denotes the object region in the image frame, the reference number 530 denotes the neighbor region of the object region 520, and the reference number 540 denotes the sliding window which slides in the neighbor region. The sliding window 540 may slides in the neighbor region along the path indicated by the dotted line in the direction shown by the black arrow in FIG. 5. Each time of sliding the sliding window 540, an image block (referred as a sliding image block) corresponding to the window may be obtained. Of course, the sliding window may slide in other manners, e.g. in an opposite direction, which is not detailed herein. The step length of each sliding may be one pixel, or may be a plurality of pixels, which is not limited herein. In step 404-2, the difference value between the value of a feature (referred to as the first feature) of a pixel in the object region and the value of the first feature of a corresponding pixel in the sliding image block (i.e. a pixel in the sliding image block, which is at the same position corresponding to the pixel in the object region) is calculated. Then in step 404-3, the difference value calculated after each sliding is accumulated. In step 404-4, it is judged whether the window slides over the entire neighbor region, and if yes, the process is ended; otherwise the process goes back to step 404-1 to slide the window to the next position.

The accumulative value of differences thus obtained can characterize the capability of the first feature of a pixel to reflect the difference between the background and the object, each feature of the pixel may be weighted by using the corresponding accumulative value, thereby effectively canceling the interference of the background to the object. In addition, the method shown in FIG. 4 involves only the addition and multiplying operations of values which incur only a relatively low computing amount. Thus, the operation efficiency can be improved effectively. In addition, the method can be readily realized by hardware.

In the above description two examples of methods of estimating the capability of a feature of a pixel of reflecting the difference between the object and the background are given with reference to FIG. 2 and FIG. 4. It should be noted that other appropriate method can be used to estimate the capability. For example, the sum of the differences between the value of a feature of a pixel in the object region and the values of the same feature of all the pixels in the whole image frame or the sum of the absolute values of the differences can be calculated, as the above mentioned accumulative value. For another example, the above mentioned accumulative value may be normalized.

As an embodiment, in the above step 106, one or more features, among the plurality of features of the pixel, which correspond to larger capabilities can be selected as the optimum features of the pixel.

Figure 3:
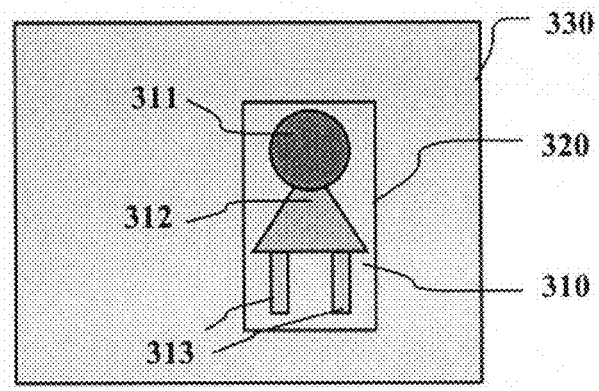
FIG. 3 is a schematic diagram illustrating an image containing an object region.

For example, in the image shown in FIG. 3, it is supposed that the gray level component value, the blue component value, and the red component value are employed as the plurality of features of the pixel (x,y) in the object region 320, and the capabilities of these features of distinguishing the object from the background are respectively represented by the values of $Y_{(x,y)D}$, $Cb_{(x,y)D}$ and $Cr_{(x,y)D}$, an optimum feature (which has the strongest capability of distinguishing the object from the background) among the features may be selected by using the following equation:

$$V_{(x,y)optimum} = \text{Max}(Y_{(x,y)D}, Cb_{(x,y)D}, Cr_{(x,y)D}) \qquad (4)$$

Wherein $V_{(x,y)optimum}$ denotes the largest value among $Y_{(x,y)D}$, $Cb_{(x,y)D}$ and $Cr_{(x,y)D}$, and the feature which corresponds to the largest value is the optimum feature.

As another example, the plurality of features may be sorted according to their capabilities, and one or more features which have larger capabilities (e.g. one or more features which have higher ranks in a descending order based on their capabilities) may be selected as the optimum features.

The weights of these optimum features may be set as 1, while the weights of the other features may be set as 0. Alternatively, the optimum features may be further weighted by using its accumulative value of differences, and the other features may be neglected (i.e. the weights of non-optimum features may be set as 0). As for a pixel block, the values of the first feature of all the pixels in the pixel block may be summed as the value of the first feature of the pixel value (or the average value or the medium value of the values of the first feature of all the pixels in the pixel block may be calculated as the value of the first feature of the pixel value), and then the optimum features of the pixel block may be selected and weighted as stated above in a similar manner to that for a pixel.

As another example, after step 104 and before step 106, a step of determining whether the accumulative value of the feature of the pixel is larger than or equals to a predetermined threshold may be further included (not shown). And if the accumulative value of a feature of a pixel is less than the predetermined threshold, the weight of the feature may be set as 0 in step 106, that is, the feature may be neglected; otherwise, a weight is assigned to the feature based on the accumulative value of the feature in step 106, for example, in such a case, the accumulative value of the feature or the normalized value of the accumulative value may be used as the weight of the feature; or the weight of the feature may be set as 1. The value of the predetermined threshold may be set according to the practical requirements, and is not limited herein.

Figure 6:
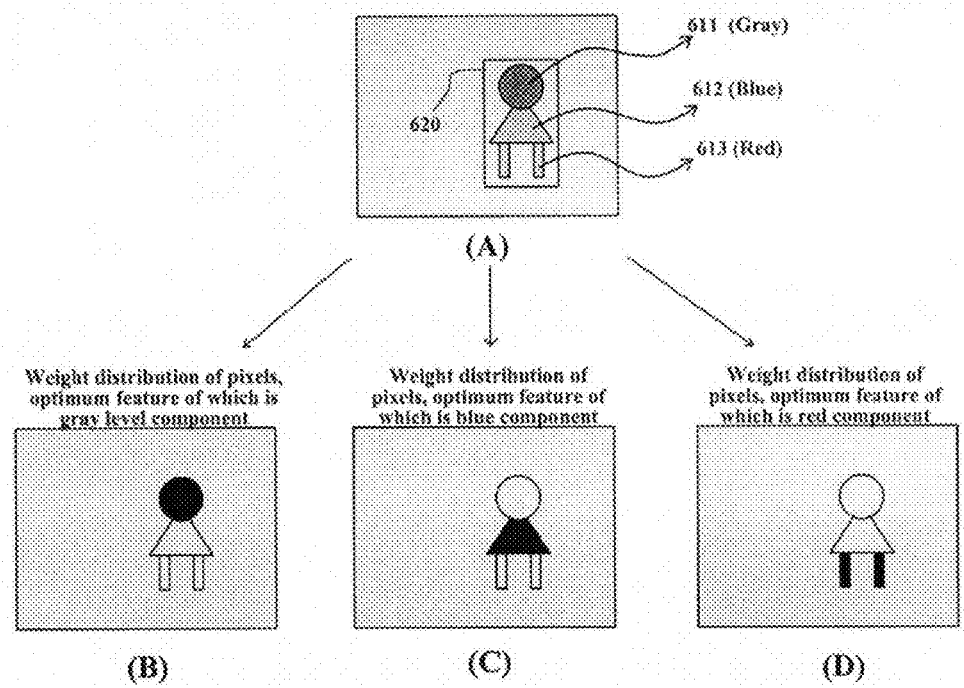
FIG. 6 is a schematic diagram illustrating a method of weighting the optimum features.

Using the image shown in FIG. 6 as an example, it is supposed that the head 611 of the object is in gray color, the upper body 612 is in blue color and the lower body is in red color. Thus, the gray level component value (Y), the blue component value (Cb) and red component value (Cr) are selected as the plurality of features of the pixel (x,y) in the object region 620. If one of the 3 features is selected as the optimum feature of the pixel (x,y) by using the method shown in the equation (4), the features may be assigned with weights by using the following equation:

$$\text{Weight}_{(x,y)\_Y} = \quad (5)$$
$$\begin{cases} V_{(x,y)optimum}, & F_{(x,y)optimum} = Y \text{ and } V_{(x,y)optimum} \geq T \\ 0, & \text{others} \end{cases}$$

$$\text{Weight}_{(x,y)\_Cb} = \quad (6)$$
$$\begin{cases} V_{(x,y)optimum}, & F_{(x,y)optimum} = Cb \text{ and } V_{(x,y)optimum} \geq T \\ 0, & \text{others} \end{cases}$$

$$\text{Weight}_{(x,y)\_Cr} = \quad (7)$$
$$\begin{cases} V_{(x,y)optimum}, & F_{(x,y)optimum} = Cr \text{ and } V_{(x,y)optimum} \geq T \\ 0, & \text{others} \end{cases}$$

Wherein Weight$_{(x,y)\_Y}$ denotes the weight of the gray level component feature, Weight$_{(x,y)\_Cb}$ denotes the weight of the blue component feature, and Weight$_{(x,y)\_Cr}$ denotes the weight of the red component feature. $V_{(x,y)optimum}$ denotes the largest value among $Y_{(x,y)D}$, $Cb_{(x,y)D}$ and $Cr_{(x,y)D}$. $F_{(x,y)optimum}$ denotes the feature corresponding to $V_{(x,y)optimum}$ (i.e. the feature the accumulative value of which is $V_{(x,y)optimum}$). T denotes the predetermined threshold. The value of the predetermined threshold may be set according to the practical requirements, and is not limited herein.

FIG. 6(B) shows the distribution of weights of pixels, the gray level component of which is the optimum feature. As shown in FIG. 6 (B), for the gray level component feature, the weights of the feature of the pixels in the head region 611 are set to larger values, while the weights of the feature of the pixels in the other part are set as 0. FIG. 6(C) shows the distribution of weights of pixels, the blue component of which is the optimum feature. As shown in FIG. 6 (C), for the blue component feature, the weights of the feature of the pixels in the upper body 612 are set to larger values, while the weights of the feature of the pixels in the other part are set as 0. FIG. 6(D) shows the distribution of weights of pixels, the red component of which is the optimum feature. As shown in FIG. 6 (D), for the red component feature, the weights of the feature of the pixels in the lower body 613 are set to larger values, while the weights of the feature of the pixels in the other part are set as 0. As can be seen, by using the above method, the object and background shown in FIG. 6 can be distinguished from each other effectively, that is, the interference of the background to the object can be canceled entirely.

After the features (and the weights thereof) are selected for each pixel in the object region, the object tracking or matching in the subsequent image frames may be performed by using corresponding method with the selected features (and the weights thereof).

Figure 7:
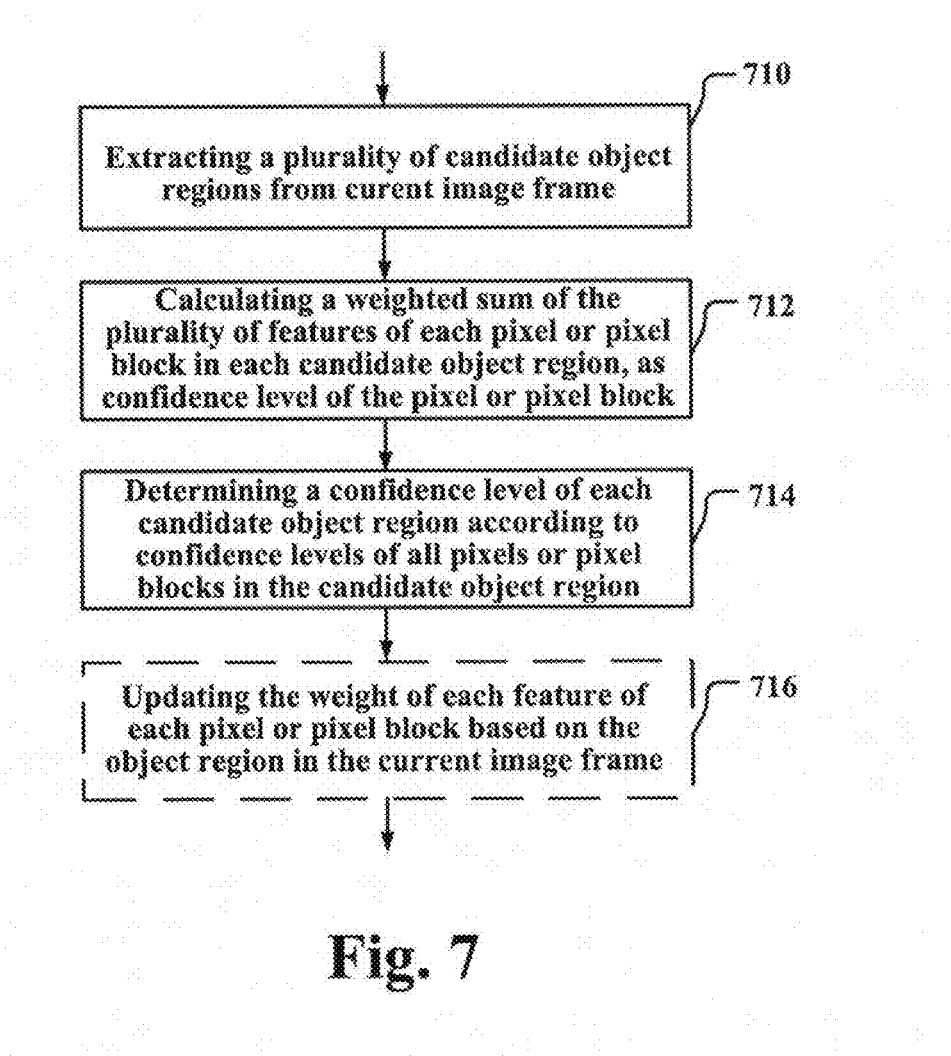
FIG. 7 is a schematic flow chart illustrating an object tracking or matching method according to another embodiment of the disclosure.

FIG. 7 shows an object tracking method according to an embodiment of the disclosure. The process shown in FIG. 7 is performed to the subsequent image frames, after the plurality of features and the weights thereof for each pixel in the object region in a previous image frame are obtained by using the above described processes. In the process shown in FIG. 7, the plurality of features (or the optimum feature(s)) and the weights thereof for each pixel in the object region are utilized.

As shown in FIG. 7, the method includes steps 710, 712 and 714.

In step 710, candidate object regions are extracted from a current image frame (the current image frame refers to an image frame subsequent to the image frame used to calculate the weights of the features of each pixel by using the method shown with reference to FIGS. 1-6). The shape and size of a candidate object region are the same as those of the above mentioned object region. As an example, the candidate object regions may be selected from the neighbor region corresponding to that of the object region in the previous image frame. For example, for a moving object, since its moving speed is limited, the moved distance between two adjacent image frames is limited, too. The moved distance between two adjacent frames may be estimated based on the moving object's moving speed and direction. Then in the next image frame, the object may be searched in the neighbor region corresponding to that of the object region in the previous image frame. One or more candidate object regions can be selected from the neighbor region, the description of which is not detailed herein.

Then in step 712, the values of each of the plurality of features (the same as those described above, the description of which is not repeated) for each pixel in each candidate object region are obtained, by using the plurality of features and the weights thereof for each pixel in the object region obtained with the above described method. The weighted sum of the values of these features is calculated, as the confidence level of each pixel in the candidate object region. If the weight of a feature is 0, the value of this feature is not obtained or calculated.

Then in step 714, the confidence level of a candidate object region is determined based on the confidence levels of all the pixels in the candidate object region. For example, the average value, the sum or the medium value of the confidence levels of all the pixels in the candidate object region may be calculated as the confidence level of the candidate object region.

If the confidence level of a candidate object region is larger than or equal to a predetermined threshold, it may be determined that the candidate object region is the object region containing the object; otherwise, it may be determined that the candidate object region is not the object region and the process goes back to above steps 710, 712 and 714 to processing the next candidate object region.

The method shown in FIG. 7 may be used to track or match an object. Since different features are used for different pixels and the weights of the features for each pixel reflect the capabilities of these features of distinguishing the object from the background, the interference of the background to the object may be effectively cancelled, thereby improving the preciseness of the object tracking or matching. In addition, the computation involved in the method is simple and the amount of the computation is small. Thus the image processing speed and efficiency can be improved significantly, and the method is easy to be realized by hardware.

As a particular embodiment, after obtaining the object region of an image frame by using the method shown in FIG. 7, a step of updating the weights of the features of each pixel by using the newly obtained object region may be included (dotted block 716 in FIG. 7). Particularly, the difference between the value of a feature of a pixel in the newly obtained object region and the value of the same feature of the corresponding pixel in the object region in the previous image frame used to calculate the weight last time may be calculated to obtain the new weight of the feature of the pixel. The lower the difference is, the more stable the feature is, which means that the feature can be assigned with a higher weight. As an example, if the weight of a to feature of a pixel is zero, the weight of this feature of this pixel is not updated. During the object tracking, updating the weight of each feature of each pixel can ensure the preciseness of the tracking.

Using the image shown in FIG. 6 as an example, it is supposed that the gray level component value (Y), the blue component value (Cb) and the red component value (Cr) are selected as the features of a pixel in the object region, the weights of the features can be updated by using the following equation:

$$\text{Weight}_{(x,y)\_Y} = \text{Max} - |Y_{1st\_(x,y)} - Y_{currentframe\_(x,y)}|, \text{ if Weight}_{(x,y)\_Y} \neq 0$$

$$\text{Weight}_{(x,y)\_Cb} = \text{Max} - |Cb_{1st\_(x,y)} - Cb_{currentframe\_(x,y)}|, \text{ if Weight}_{(x,y)\_Cb} \neq 0 \quad (8)$$

$$\text{Weight}_{(x,y)\_Cr} = \text{Max} - |Cr_{1st\_(x,y)} - Cr_{currentframe\_(x,y)}|, \text{ if Weight}_{(x,y)\_Cr} \neq 0$$

Wherein $\text{Weight}_{(x,y)\_Y}$ denotes the weight of the gray level component feature of the pixel (x,y), $\text{Weight}_{(x,y)\_Cb}$ denotes the weight of the blue component feature of the pixel (x,y), and $\text{Weight}_{(x,y)\_Cr}$ denotes the weight of the red component feature of the pixel (x,y). $Y_{1st\_(x,y)}$ denotes the value of the gray level component feature of the pixel (x,y) obtained when calculating the weight of the feature last time (e.g. when the initial image frame is processed), $Cb_{1st\_(x,y)}$ denotes the value of the blue component feature of the pixel (x,y) obtained when calculating the weight of the feature last time, and $Cr_{1st\_(x,y)}$ denotes the value of the red component feature of the pixel (x,y) obtained when calculating the weight of the feature last time. $Y_{currentframe\_(x,y)}$ denotes the value of the gray level component feature of the pixel (x,y) in the object region of the current image frame, $Cb_{currentframe\_(x,y)}$ denotes the value of the blue component feature of the pixel (x,y) in the object region of the current image frame, and $Cr_{currentframe\_(x,y)}$ denotes the value of the red component feature of the pixel (x,y) in the object region of the current image frame. Max denotes a preset value. For example, for any feature F of any pixel, the value of Max may be set by those skilled in the art according to practice requirements, as long as the condition $\text{Max} - |(F_{1st} - F_{currentframe})| \geq 1 > 0$ is met (wherein $F_{1st}$ denotes the value of the feature obtained in the last calculation and $F_{currentframe}$ denotes the value of the same feature of the corresponding pixel in the current image frame). The disclosure is not limited to any particular value thereof.

In an example, the weights of the features of each pixel in the object region can be updated every two or more frames periodically. In another example, the weights of the features of each pixel in the object region can be updated at predetermined times. The disclosure is not limited to any particular example.

Figure 8:
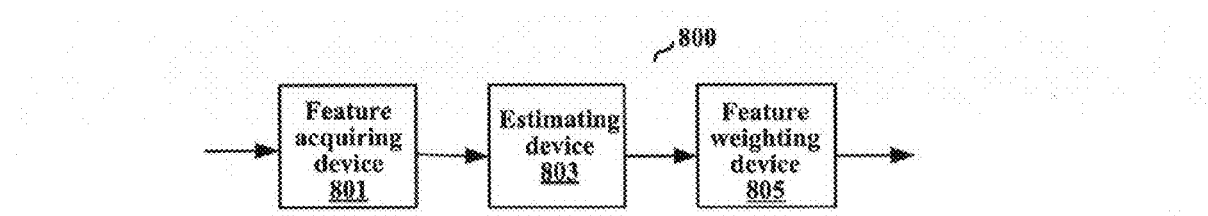
FIG. 8 is a schematic block diagram illustrating the structure of an image processing apparatus according to an embodiment of the disclosure.

According to some embodiments of the disclosure, there are provided some image processing apparatuses. FIG. 8 is a schematic block diagram illustrating the structure of an image processing apparatus according to an embodiment. The image processing apparatus 800 shown in FIG. 8 may use any of the image processing method described above with reference to FIG. 1 to FIG. 6 to process the image.

As shown in FIG. 8, the image processing apparatus 800 may include a feature acquiring device 801, an estimating device 803 and a feature weighting device 805.

The feature acquiring device 801 is configured to acquire, for each pixel or pixel block in an object region of an image frame (e.g. an initial image frame in a video sequence or other image sequence), values of a plurality of features of the pixel. The feature acquiring device 801 outputs the values of a plurality of features of each pixel in the object region to the estimating device 803.

Similar to the above method embodiments, the object region refers to a region containing an object in the image frame. The plurality of features of a pixel may include any features related to the pixel. For example, the feature acquiring device 801 may use the gray level and/or color (such as blue and/or red component, etc.) of the pixel. Or the feature acquiring device 801 may use any other appropriate feature, such as contour feature, color or gray-level Histogram feature and/or texture feature, according to the practical requirements of the image to be detected. The disclosure is not limited to any particular example herein.

After the feature acquiring device obtains the values of the plurality of features of the pixel, the estimating device 803 estimates the capability, of each of the plurality of features of each pixel or each pixel block, of reflecting the difference between background and object in the image frame according to the object region and the background in the image frame, and outputs the estimation result to the feature weighting device 805. In other words, the capability of each feature of each pixel or pixel block distinguishing the object region from the background is estimated. The capability may be estimated by using the method to be described below with reference to FIG. 2 or FIG. 4, or using any other appropriate estimating method.

The estimating device 803 may estimate the capability by using the method to be described below with reference to FIG. 2 or FIG. 4, or using any other appropriate estimating method.

For example, the estimating device 803 may calculate the accumulative value of the difference values between the value of a feature (referred to as the first feature) of a pixel or pixel block in the object region and the values of the same feature of a plurality of pixels or pixel blocks in the neighbor region of the object region, i.e. by using the method shown in FIG. 2. The larger the accumulative value is, the stronger the capability of the first feature of the pixel or pixel block of reflecting the difference between background and object is, and vise versa. For another example, the estimating device 803 may use a sliding window which is of the same size with the object region to slide in the neighbor region of the object region, and calculate the difference value between the value of a feature (referred to as the first feature) of a pixel in the object region and the value of the first feature of a corresponding pixel in the sliding image block, and accumulate the difference value calculated after each sliding (i.e. by using the method shown in FIG. 4). The estimating device 803 may use other appropriate method to calculate the accumulative value. For example, the sum of the differences between the value of a feature of a pixel in the object region and the values of the same feature of all the pixels in the whole image frame or the sum of the absolute values of the differences can be calculated, as the above mentioned accumulative value. For another example, the above mentioned accumulative value may be normalized.

The feature weighting device 805 is configured to assign a weight to each of the plurality of features of each pixel or pixel block according to the capability of the feature reflecting difference between background and object obtained by the estimating device 803. As an embodiment of the disclosure, the larger the capability of a feature is, the larger the weight assigned to the feature is. That is, the weaker the capability of a feature is, the smaller the weight assigned to the feature is. As another embodiment of the disclosure, the feature(s) which has a strong capability of reflecting the difference between background and object is assigned with the weight of "1", and the feature(s) which has a weak capability of reflecting the difference between background and object is assigned with the weight of "0".

The above image processing apparatus realizes pixel-based feature selection. That is, the image processing apparatus can select different features for different pixels in the object region. In the case that the same features are used for some pixels, the weights for the features are different for the different pixels. In addition, each feature of a pixel is weighted according to its capability of differentiating the object from the background, that is, the feature which has a strong capability of differentiating the object from the background is emphasized, while the feature which has a weak capability of differentiating the object from the background is weakened, such that the weight of a feature reflects the feature's capability of describing the object (its capability of differentiating the object from the background). Accordingly, the interference of the background to the object may be canceled effectively.

As a particular embodiment, the feature weighting device 805 may select one or more features, among the plurality of features of the pixel, which correspond to larger capabilities as the optimum features of the pixel. For example, the feature weighting device 805 can use the method described above with reference to FIG. 3 or equation (4) to select the optimum features, the description of which is not repeated.

As another example, the feature weighting device 805 may further determine whether the accumulative value of a feature of a pixel is larger than or equals to a predetermined threshold. And if the accumulative value of a feature of a pixel is less than the predetermined threshold, the feature weighting device 805 may set the weight of the feature as 0. That is, the feature may be neglected. Otherwise, the feature weighting device 805 may assign a weight to the feature based on the accumulative value of the feature. For example, in such a case, the accumulative value of the feature or the normalized value of the accumulative value may be used as the weight of the feature; or the weight of the feature may be set as 1. The value of the predetermined threshold may be set according to the practical requirements, and is not limited herein. The feature weighting device 805 may weight the features by using any of the method described above with reference to FIG. 6, and equations (5)-(7), the description of which is not repeated.

Figure 9:
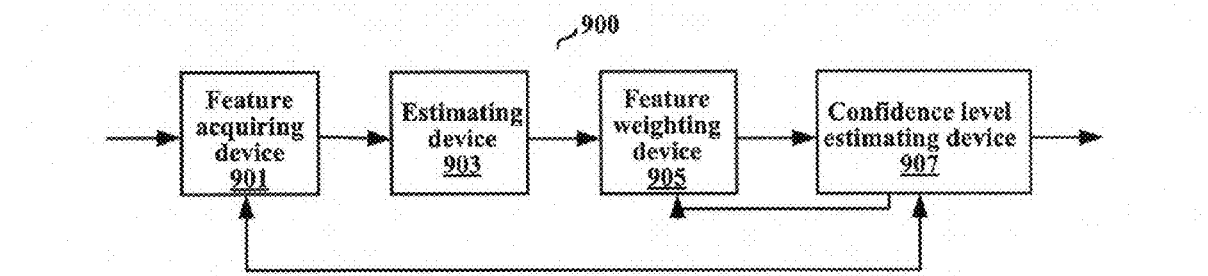
FIG. 9 is a schematic block diagram illustrating the structure of an image processing apparatus according to another embodiment of the disclosure.

FIG. 9 shows an image processing apparatus according to another embodiment of the disclosure. Similar to the above image processing apparatus 800, the image processing apparatus 900 includes a feature acquiring device 901, an estimating device 903 and a feature weighting device 905. The difference lies in that, the image processing apparatus 900 further includes a confidence level estimating device 907.

The feature acquiring device 901, the estimating device 903 and the feature weighting device 905 are respectively similar in functions and connections to the feature acquiring device 801, the estimating device 803 and the feature weighting device 805, the description of which is not repeated.

The confidence level estimating device 907 is configure to process the subsequent image frames by using the method described above with reference to FIG. 7, to track or match the object in the subsequent image frames. After the feature acquiring device 901, the estimating device 903 and the feature weighting device 905 obtain the plurality of features (or optimum features) and the weights thereof for each pixel in the object region in a previous image frame, the confidence level estimating device 907 uses these features and the weights thereof to track the object in the subsequent image frames.

Particularly, the feature acquiring device 901 is further configured to extract candidate object regions from a subsequent image frame, and acquire the values of the plurality of features of each pixel or pixel block in each of the candidate object regions, and output the values to the confidence level estimating device 907. The feature acquiring device 901 may extract the candidate object regions and acquire the values of the plurality of features of each pixel or pixel block in each of the candidate object regions by using the method described above with reference to step 710, the description of which is not repeated.

The confidence level estimating device 907 is configured to calculate the weighted sum of the values of the plurality of feature of each pixel or pixel block in a candidate object region, as the confidence level of each pixel or pixel block; and determine the confidence level of the candidate object region based on the confidence levels of all the pixels or pixel blocks in the candidate object region. As an example, the confidence level estimating device 907 may calculate the confidence levels by using the method described above with reference to steps 712-714, the description of which is not repeated.

As an example, the confidence level estimating device 907 may further determine whether the confidence level of a candidate object region is larger than or equal to a predetermined threshold, and if yes, it determines that the candidate object region is the object region containing the object; otherwise, it determines that the candidate object region is not the object region and instructs the feature acquiring device 901 to process the next candidate object region.

In the image processing apparatus 900 shown in FIG. 9, different features are used for different pixels and the weights of the features for each pixel reflect the capabilities of these features of distinguishing the object from the background. Thus, the interference of the background to the object may be effectively cancelled, thereby improving the preciseness of the object tracking or matching. In addition, the computation involved in the apparatus is simple and the amount of the computation is small. Thus the image processing speed and efficiency can be improved significantly.

As a particular embodiment, after obtaining the object region of a subsequent image frame, the confidence level estimating device 907 may further instruct the feature weighting device 905 to update the weights of the features of each pixel by using the newly obtained object region. The feature weighting device 905 may calculate the difference between the value of a feature of a pixel in the newly obtained object region and the value of the same feature of the corresponding pixel in the object region in the previous image frame used to calculate the weight last time, as the new weight of the feature of the pixel. The feature weighting device 905 may update the weights by using the method described above with reference to step 716, and equation (8), the description of which is not repeated. During the object tracking, updating the weight of each feature of each pixel can ensure the preciseness of the tracking.

Figure 10:
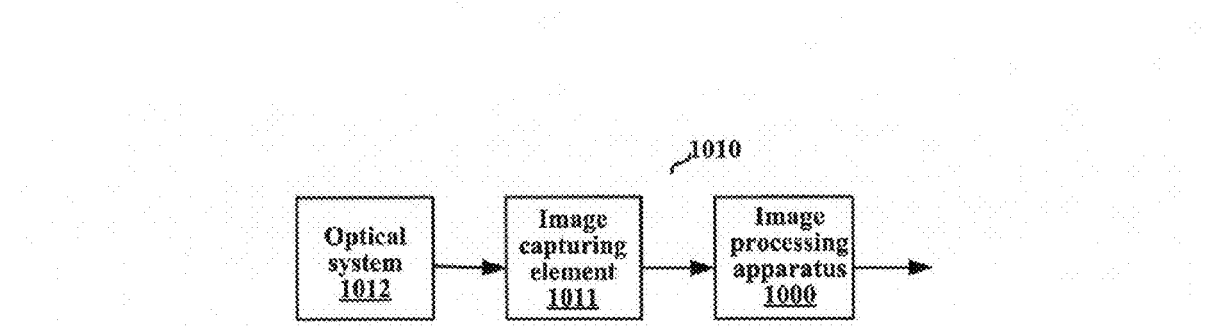
FIG. 10 is a schematic block diagram illustrating the structure of a camera according to an embodiment of the disclosure.

According to the disclosure, the above image processing apparatus (800 or 900) or method may be applied to any electronic device capable of image processing (e.g. object tracking), such as a camera, or a video camera. FIG. 10 shows the configuration of a camera apparatus according to an embodiment of the disclosure. As shown in FIG. 10, the camera apparatus 1010 may include an image capturing element 1011, an optical system 1012 and an image processing apparatus 1000. The optical system 1012 is configured to form an image of an object on the image capturing element 1011. The optical system 1012 and the image capturing element 1011 may be realized by using any appropriate optical lenses, the description of which is not detailed. The image processing apparatus 1000 may track the object in the image frames captured by the image capturing element 1011. The image processing apparatus 1000 may be of the same structure and functions as the image processing apparatus 800 or 900 shown in FIG. 8 or FIG. 9, the description of which is not repeated.

It should be understood that in the disclosure the expression such as "the first" is merely to distinguish the involved feature in wording, and should not be regarded as limiting to the disclosure.

Figure 11:
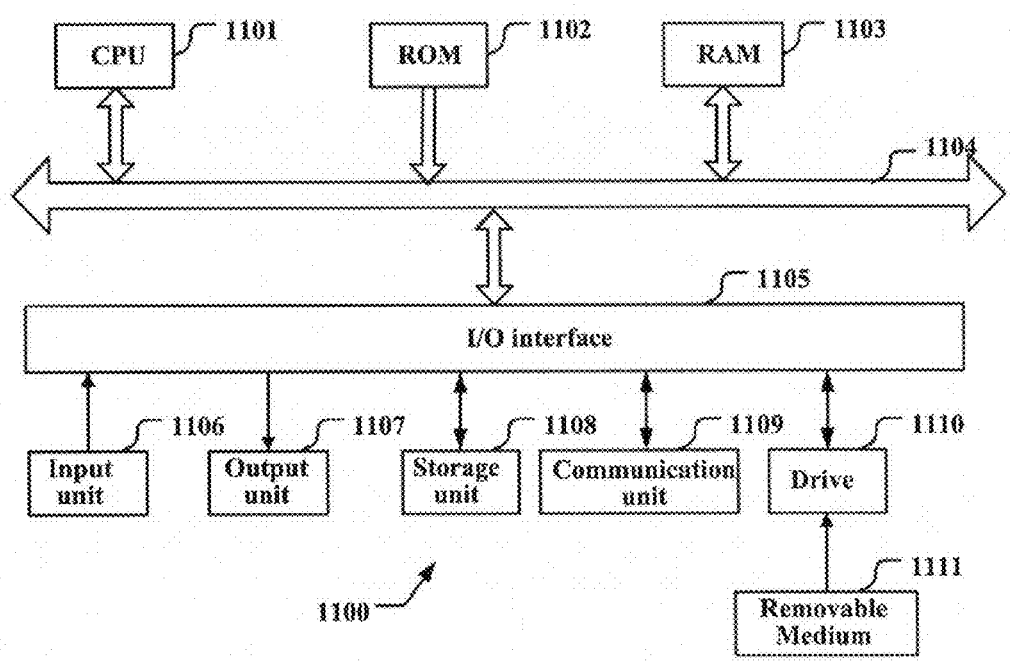
FIG. 11 is a schematic block diagram illustrating the structure of a computer for implementing the embodiments or examples of the disclosure.

The components, units or steps in the above apparatuses and methods can be configured with software, hardware, firmware or any combination thereof. As an example, in the case of using software or firmware, programs constituting the software for realizing the above method or apparatus can be installed to a computer with a specialized hardware structure (e.g. the general purposed computer 1100 as shown in FIG. 11) from a storage medium or a network. The computer, when installed with various programs, is capable of carrying out various functions.

In FIG. 11, a central processing unit (CPU) 1101 executes various types of processing in accordance with programs stored in a read-only memory (ROM) 1102, or programs loaded from a storage unit 1108 into a random access memory (RAM) 1103. The RAM 1103 also stores the data required for the CPU 1101 to execute various types of processing, as required. The CPU 1101, the ROM 1102, and the RAM 1103 are connected to one another through a bus 1104. The bus 1104 is also connected to an input/output interface 1105.

The input/output interface 1105 is connected to an input unit 1106 composed of a keyboard, a mouse, etc., an output unit 1107 composed of a cathode ray tube or a liquid crystal display, a speaker, etc., the storage unit 1108, which includes a hard disk, and a communication unit 1109 composed of a modem, a terminal adapter, etc. The communication unit 1109 performs communicating processing. A drive 1110 is connected to the input/output interface 1105, if needed. In the drive 1110, for example, removable media 1111 is loaded as a recording medium containing a program of the present invention. The program is read from the removable media 1111 and is installed into the storage unit 1108, as required.

In the case of using software to realize the above consecutive processing, the programs constituting the software may be installed from a network such as Internet or a storage medium such as the removable media 1111.

Those skilled in the art should understand the storage medium is not limited to the removable media 1111, such as, a magnetic disk (including flexible disc), an optical disc (including compact-disc ROM (CD-ROM) and digital versatile disk (DVD)), a magneto-optical disc (including an MD (Mini-Disc) (registered trademark)), or a semiconductor memory, in which the program is recorded and which are distributed to deliver the program to the user aside from a main body of a device, or the ROM 1102 or the hard disc involved in the storage unit 1108, where the program is recorded and which are previously mounted on the main body of the device and delivered to the user.

The present disclosure further provides a program product having machine-readable instruction codes which, when being executed, may carry out the methods according to the embodiments.

Accordingly, the storage medium for bearing the program product having the machine-readable instruction codes is also included in the disclosure. The storage medium includes but not limited to a flexible disk, an optical disc, a magneto-optical disc, a storage card, or a memory stick, or the like.

In the above description of the embodiments, features described or shown with respect to one embodiment may be used in one or more other embodiments in a similar or same manner, or may be combined with the features of the other embodiments, or may be used to replace the features of the other embodiments.

As used herein, the terms the terms "comprise," "include," "have" and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Further, in the disclosure the methods are not limited to a process performed in temporal sequence according to the order described therein, instead, they can be executed in other temporal sequence, or be executed in parallel or separatively. That is, the executing orders described above should not be regarded as limiting the method thereto.

While some embodiments and examples have been disclosed above, it should be noted that these embodiments and examples are only used to illustrate the present disclosure but not to limit the present disclosure. Various modifications, improvements and equivalents can be made by those skilled in the art without departing from the scope of the present disclosure. Such modifications, improvements and equivalents should also be regarded as being covered by the protection scope of the present disclosure.

What is claimed is:

1. An image processing apparatus, comprising:
   a feature acquiring device, configured to acquire values of a plurality of features of each pixel block in an object region of an image frame, each pixel block containing N×M pixels, N≥1, M≥1;
   an estimating device, configured to estimate capability, of each of the plurality of features of each pixel block, of reflecting difference between background and an object in the image frame according to the object region and the background in the image frame; and
   a feature weighting device, configured to weight the plurality of features of each pixel block according to the capability of each feature reflecting difference between background and the object.

2. The image processing apparatus of claim 1, wherein the estimating device is configured to estimate the capability of each of the plurality of features of each pixel block by the following:
   calculating, for each feature of the pixel block in the object region, an accumulative value of difference values between value of the feature from the pixel block and values of the same feature of a plurality of pixel blocks in a neighbor region of the object region,
   wherein a feature, among the plurality features of the pixel block, corresponding to a larger accumulative value has a stronger capability of reflecting the difference between the background and the object, and a feature, among the plurality features of the pixel block, corresponding to a smaller accumulative value has a weaker capability of reflecting the difference between the background and the object.

3. The image processing apparatus of claim 2, wherein the estimating device is configured to calculate the accumulative value for each feature of the pixel block in the object region by the following:
   sliding a sliding window, which is of same size with the object region, in the neighbor region, calculating a difference value between the value of the feature of the pixel block and a value of the feature of a pixel block in a sliding image block obtained by sliding the window; and accumulating difference values obtained by sliding the window multiple of times.

4. The image processing apparatus of claim 2, wherein the feature weighting device is further configured to:

select, from the plurality of features, one or more features corresponding to larger accumulation values for each pixel block in the object region, and set weights of the other features of the plurality of features as 0.

5. The image processing apparatus of claim 2, wherein the feature weighting device is further configured to:
determine whether the accumulative value for each feature of each pixel block is larger than or equal to a predetermined threshold, and if no, set a weight of the feature as 0.

6. The image processing apparatus of claim 1, wherein:
the feature acquiring device is further configured to extract a plurality of candidate object regions from a subsequent image frame, and acquire values of the plurality of features of each pixel block in each candidate object region, and
wherein the image processing apparatus further comprises:
a confidence level estimating device, configured to calculate a weighted sum of the plurality of features of each pixel block in each candidate object region, as a confidence level of the each pixel block in the each candidate region; determine a confidence level of the each candidate object region according to confidence levels of all pixel blocks in the each candidate object region; and determine an candidate object region which corresponds to a largest confidence level among the plurality of candidate object regions to contain the object.

7. The image processing apparatus of claim 6, wherein if the confidence level estimating device determines a candidate object region to contain the object, the feature weighting device is further configured to:
calculate a difference between a value of each feature of each pixel block in the candidate object region and the value of the same feature of a corresponding pixel block in a previous image frame used to calculate the weights for the plurality of features last time, to calculate a new weight for the feature.

8. An image processing apparatus, comprising:
at least one processor, configured to:
acquire values of a plurality of features of each pixel block in an object region of an image frame, each pixel block containing N×M pixels, N≥1, M≥1;
estimate capability, of each of the plurality of features of each pixel block, of reflecting difference between background and the object in the image frame according to the object region and the background in the image frame;
weight the plurality of features of each pixel block according to the capability of each feature reflecting difference between background and the object; and
a memory coupled to the at least one processor.

9. The image processing apparatus of claim 8, wherein the at least one processor is configured to estimate the capability of each of the plurality of features of each pixel block by the following:
calculating, for each feature of the pixel block in the object region, an accumulative value of difference values between value of the feature from the pixel block and values of the same feature of a plurality of pixel blocks in a neighbor region of the object region,
wherein a feature, among the plurality features of the pixel block, corresponding to a larger accumulative value has a stronger capability of reflecting the difference between the background and the object, and a feature, among the plurality features of the pixel block, corresponding to a smaller accumulative value has a weaker capability of reflecting the difference between the background and the object.

10. The image processing apparatus of claim 9, wherein the at least one processor is configured to calculate the accumulative value for each feature of the pixel block in the object region by the following:
sliding a sliding window, which is of same size with the object region, in the neighbor region, calculating a difference value between the value of the feature from the pixel block and a value of the same feature of a pixel block in a sliding image block obtained by sliding the window; and accumulating difference values obtained by sliding the window multiple of times.

11. The image processing apparatus of claim 9, wherein the at least one processor is further configured to:
select, from the plurality of features, one or more features corresponding to larger accumulation values, as optimum features of each pixel block in the object region, and set weights of the other features of the plurality of features as 0.

12. The image processing apparatus of claim 9, wherein the at least one processor is further configured to:
determine whether the accumulative value for each feature of each pixel block is larger than or equal to a predetermined threshold, and if no, set a weight of the feature as 0.

13. The image processing apparatus of claim 8, wherein:
the at least one processor is further configured to extract a plurality of candidate object regions from a subsequent image frame, and acquire values of the plurality of features of each pixel block in each candidate object region, and
wherein the at least one processor is further configured to:
calculate a weighted sum of the plurality of features of each pixel block in each candidate object region, as a confidence level of the each pixel block in the each candidate region; determine a confidence level of the each candidate object region according to confidence levels of all pixel blocks in the each candidate object region; and determine an candidate object region which corresponds to largest confidence level among the plurality of candidate object regions to contain the object.

14. The image processing apparatus of claim 13, wherein if a candidate object region to contain the object is determined, the at least one processor is further configured to:
calculate a difference between a value of each feature of each pixel block in the candidate object region and the value of the same feature extracted of a corresponding pixel block in a previous image frame used to calculate the weights for the plurality of features last time, to calculate a new weight for the feature.

15. An image processing method, comprising:
acquiring values of a plurality of features of each pixel block in an object region of an image frame, each pixel block containing N×M pixels, N≥1, M≥1;
estimating capability, of each of the plurality of features of each pixel block, of reflecting difference between background and an object in the image frame according to the object region and the background in the image frame; and
weighting the plurality of features of each pixel block according to the capability of each feature reflecting difference between background and the object.

16. The image processing method of claim 15, wherein estimating the capability of each of the plurality of features of each pixel block comprises
calculating, for each feature of the pixel block in the object region, an accumulative value of difference values between value of the feature of the pixel block and values of the same feature of a plurality of pixel blocks in a neighbor region of the object region, wherein a feature, among the plurality features of the pixel block, corresponding to a larger accumulative value has a stronger capability of reflecting the difference between the background and the object, and a feature, among the plurality features of the pixel block, corresponding to a smaller accumulative value has a weaker capability of reflecting the difference between the background and the object.

17. The image processing method of claim 16, wherein calculating the accumulative value for each feature of the pixel block in the object region comprises:

sliding a sliding window, which is of same size with the object region, in the neighbor region, calculating a difference value between the value of the feature from the pixel block and a value of the feature of a pixel block in a sliding image block obtained by sliding the window; and accumulating difference values obtained by sliding the window multiple of times.

18. The image processing method of claim 16, wherein assigning the weight to each of the plurality of features of each pixel block according to the capability of each feature comprises:

selecting, from the plurality of features, one or more features corresponding to larger accumulation values, as optimum features of each pixel block in the object region, and setting weights of the other features of the plurality of features as 0.

19. The image processing method of claim 16, further comprising:

determining whether the accumulative value for each feature of each pixel block is larger than or equal to a predetermined threshold, and if no, setting a weight of the feature as 0.

20. The image processing method of claim 15, further comprising:

extracting a plurality of candidate object regions from a subsequent image frame, and calculating a weighted sum of the plurality of features of each pixel block in each candidate object region, as a confidence level of the each pixel block in the each candidate region; determining a confidence level of the each candidate object region according to confidence levels of all pixel blocks in the each candidate object region; and determining an candidate object region which corresponds to largest confidence level among the plurality of candidate object regions to contain the object.

* * * * *